UNITED STATES PATENT OFFICE.

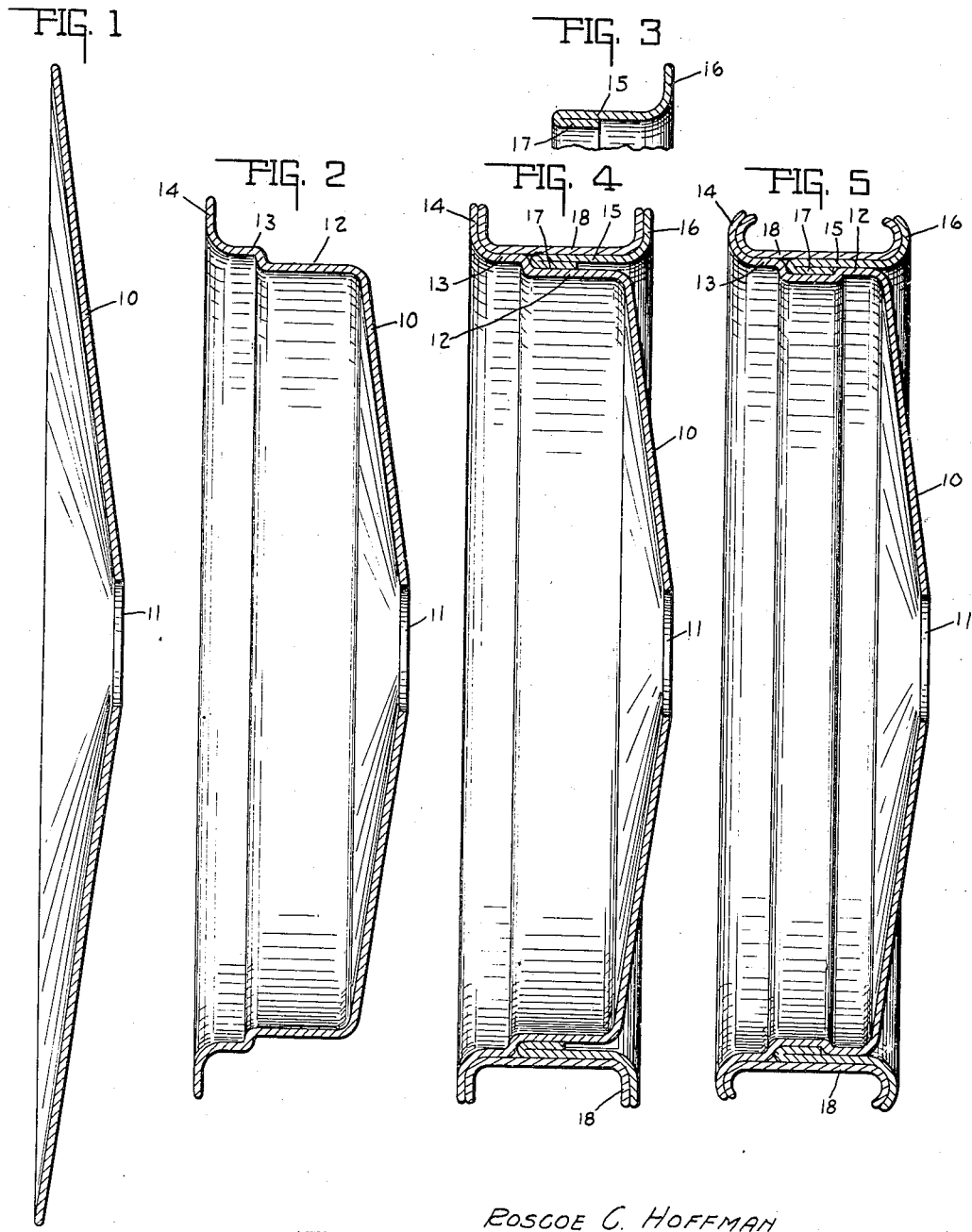

ROSCOE C. HOFFMAN, OF INDIANAPOLIS, INDIANA.

PROCESS OF FORMING DISK WHEELS.

1,380,906.　　　　Specification of Letters Patent.　　Patented June 7, 1921.

Application filed June 21, 1920. Serial No. 390,609.

*To all whom it may concern:*

Be it known that I, ROSCOE C. HOFFMAN, a citizen of the United States, and a resident of Indianapolis, county of Marion, and State of Indiana, have invented a certain new and useful Process of Forming Disk Wheels; and I do hereby declare that the following is a full, clear, and exact description thereof, reference being had to the accompanying drawings, in which like numerals refer to like parts.

This invention relates to a process of forming a disk wheel for vehicles and the like by stamping and rolling sheet metal as will be hereinafter described.

The principal feature of the invention is to provide a very simple process of cheaply manufacturing a disk vehicle wheel for the smaller and lighter vehicles whereby such wheels may be readily made in large quantities of production.

The full nature of this invention will be understood from the accompanying drawings and the following description and claims.

In the drawings Figure 1 is a central vertical cross section through the disk after the first stamping process. Fig. 2 is the same as Fig. 1 after the second stamping process. Fig. 3 shows a section through a rim portion with a part thereof broken away. Fig. 4 is a central vertical cross section showing the entire rim member and the rim portion assembled with the disk wheel portion. Fig. 5 is the same as Fig. 4 showing the assembled rims and disk wheel secured together in completed form.

This process consists of stamping a dished disk 10 in the form shown in Fig. 1 from a blank of sheet metal, which may be considered the first step in the process. The second step of the process is to stamp the disk 10 so as to shape it from the form shown in Fig. 1 to that shown in Fig. 2, wherein there will be an opening in the center for the hub, a radial flange portion 12, and offset 13 and a rim flange 14. A complementary rim 15 and rim flange 16 is formed as shown in Fig. 3 by stamping the same and rolling it so as to provide a folded over portion 17, or a bead having substantially the same shape so as to give a greater thickness at the edge represented by 17 than at the balance of the rim or flange.

The third step in the process is the assembling of the disk 10, the complementary rim 15 and the outer rim 18, said outer rim 18 having been previously rolled out in the usual manner, the outer rim 18 coinciding with the offset 13 and the flange 14, and the rim 15 and flange 16. After the parts have been assembled as shown in Fig. 4 they are rolled into the form shown in Fig. 5, whereby the flanges 14 and 16 and the complementary flange portions of the rim 18 are turned inwardly so as to clamp the tire, and a portion of the radial flange portion 12 of the disk 10 is rolled radially so as to bear directly against the single thickness portion of the rim 15, whereby the doubled portion 17 or a beaded portion will be clamped tightly and securely held in position, as shown in Fig. 5.

By means of this process a completely assembled disk wheel and tire rim are formed and secured together in a very simple manner, whereby such a wheel may be produced in large quantities for the smaller type of vehicles. It will be understood that a cheaper construction may be made by eliminating the rim 18 as the rim portion 15 may be rigidly held in place by the clamping of the enlarged or beaded edge 17 between the shoulder 13 and the rolled portion 12 of the disk.

The invention claimed is:

1. The process of forming a disk wheel composed of stamping out the disk portion of said wheel from sheet metal, stamping said disk portion into the shape of a flanged wheel having a shoulder thereon, mounting a complementary flanged rim portion having an enlarged edge on said wheel so as to abut said shoulder and rolling the periphery of said disk radially outward so as to clamp said enlarged edge between said rolled portion and shoulder for forming the rim of said wheel.

2. The process of forming a disk wheel composed of stamping out the disk portion of said wheel from sheet metal, stamping said disk portion into the shape of a flanged wheel having a shoulder thereon, mounting a flanged rim over said wheel portion so as to abut the flange portion thereof, inserting a complementary flanged rim portion having an enlarged edge between said last mentioned rim and wheel so as to abut said shoulder and roll said wheel and flanges so as to cause said flanges to be turned inwardly and the periphery of said wheel to clamp said enlarged edge against said shoulder whereby said rim and rim portion will be maintained securely about the periphery of said wheel.

3. The process of forming a disk wheel composed of stamping out the disk portion of said wheel from sheet metal, stamping said disk portion into the shape of a flange wheel having a shoulder thereon, mounting a flanged rim over said wheel portion so as to abut the flange portion thereof, forming a complementary flanged portion, doubling one edge thereof, inserting said flange portion between said rim and wheel and rolling the flanges thereof inwardly and the circumference of the wheel outwardly so as to clamp the doubled edge of said rim portion against said shoulder.

4. The process of forming a disk wheel composed of stamping out the disk portion of said wheel from sheet metal into the shape of a flanged wheel having a shoulder thereon, forming a complementary flanged rim portion having a bead formed on the inner side of the periphery, mounting said complementary flanged portion over the periphery of said disk wheel, and rolling the flange of said wheel and complementary rim inwardly and a portion of the periphery of said wheel outwardly so as to clamp said bead between said rolled portion and shoulder.

5. The process of forming a disk wheel composed of stamping out the disk and flange portion of said wheel from sheet metal having an enlarged portion extending inwardly thereover, mounting said flanged rim portion over said disk wheel, and rolling the periphery of said wheel so as to cause it to embrace said enlarged portion whereby said flanged rim will be securely fixed thereon.

In witness whereof I have hereunto affixed my signature.

ROSCOE C. HOFFMAN.